United States Patent
McGuffin et al.

(10) Patent No.: US 7,000,204 B2
(45) Date of Patent: Feb. 14, 2006

(54) POWER ESTIMATION BASED ON POWER CHARACTERIZATIONS

(75) Inventors: Tyson R. McGuffin, Fort Collins, CO (US); Thomas W. Chen, Fort Collins, CO (US); David C. Burden, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

(21) Appl. No.: 10/653,650

(22) Filed: Sep. 2, 2003

(65) Prior Publication Data

US 2005/0050495 A1    Mar. 3, 2005

(51) Int. Cl.
*G06F 17/50*    (2006.01)

(52) U.S. Cl. ............................................ 716/5; 716/18

(58) Field of Classification Search ................ 716/1–2, 716/4–7, 18; 703/13–14, 18
See application file for complete search history.

(56) References Cited

U.S. PATENT DOCUMENTS

| | | | |
|---|---|---|---|
| 6,327,552 B1 | 12/2001 | Nemani et al. | |
| 6,345,379 B1 | 2/2002 | Khouja et al. | |
| 6,543,036 B1 | 4/2003 | Iyer et al. | |
| 6,557,149 B1 | 4/2003 | Morrise et al. | |
| 6,728,941 B1 * | 4/2004 | Chen ............................. | 716/5 |

* cited by examiner

*Primary Examiner*—Paul Dinh

(57) ABSTRACT

Systems and methods are provided that can be utilized to estimate power associated with a circuit design. The estimated power is determined by employing power characterizations associated with dynamic and static power related parameters of a circuit design. The power characterizations can be determined prior to circuit design optimizations, stored and utilized during circuit design optimizations.

24 Claims, 6 Drawing Sheets

POWER ESTIMATION BASED ON POWER CHARACTERIZATIONS

CROSS REFERENCE TO RELATED APPLICATIONS

The present application is related to Tyson R. McGuffin, et al. U.S. Patent Application entitled "Power Estimation Based On Power Characterizations Of Non-Conventional Circuits", Filed Aug. 29, 2003, Ser. No. 10/653,328, which is assigned to the same assignee as the present application and which is incorporated herein by reference.

TECHNICAL FIELD

The present invention relates to circuit analysis and, more particularly, to an approach to estimate power consumption of a circuit design employing power characterizations.

BACKGROUND OF INVENTION

Power consumption is becoming an increasing concern in the design of integrated circuits (ICs), particularly for very large scale integration (VLSI) chip design. Increases in power consumption are outpacing the advantages of advances in scaling in silicon technologies, and the benefits of reducing power supply voltages. To address this concern, many computer-aided design (CAD) tools have been developed to measure or estimate power consumption in VLSI designs. These tools for example provides for system level design, verification, analysis and simulated testing of register-transfer logic (RTL), gates and physical layout structures. In one example, certain CAD software may further perform transistor-level timing analysis of electronic designs. The estimated power consumption is employed to help designers meet target power parameters and ultimately facilitate design convergence.

Power efficiency within the electronic design is important because, among other reasons, power may often be traded for increased performance. Due to the increased complexity of electronic designs often exceeding one billion components, optimizing power consumption within the circuit design has become increasingly difficult. Power consumption within the electronic design may derive from several sources, including dynamic switching power of capacitors, DC currents including leakage from diodes, and crossover currents in static complimentary metal oxide semiconductor (CMOS) logic using field effect transistors (FETs), such as metal-oxide silicon field effect transistors (MOSFETs).

Techniques used to estimate power consumption in VLSI chip designs can be divided into two general groups: simulation-based techniques and statistics-based techniques. Existing simulation-based approaches are employed for performance and power consumption analysis of VLSI designs. These simulation approaches tend to be highly dependent on the input patterns (or input vectors) used to stimulate the circuit model. That is, the power estimation tool usually requires varying input patterns designed specifically for power estimation. Optimization techniques are used to optimize the performance, size and power consumption of a design. Power estimation for both the simulation and optimization techniques is computationally expensive and time consuming.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

The present invention relates generally to systems and methods to estimate power consumption associated with a circuit design. One aspect of the present invention provides a power estimation system that determines power related parameters based on power characterizations that functionally relate circuit design characteristics to power related parameters. The power related parameters are then utilized to compute static (e.g., leakage power) and dynamic power (e.g., switching power).

In another aspect of the invention, dynamic power is computed by determining total switching power. The total switching power is computed by determining the switching capacitance and total crossover current associated with at least one unit of a circuit design and evaluating switching power based on a relationship of the supply voltage, the clock frequency, the switching capacitance and the total crossover current. The total switching capacitance is evaluated employing node capacitance and predetermined activity factors associated with a given node, and summing the switching capacitances over a plurality of nodes. The total crossover current is evaluated employing channel connected region characteristics and predetermined equations that functionally relate channel connected region characteristics to crossover current, and summing the crossover currents over a plurality of channel connected regions.

In another aspect of the invention, the static power is determined by computing total leakage power employing total leakage current and the supply voltage associated with the circuit design. The total leakage current is determined by evaluating a relationship of transistor gate area and predetermined coefficients that functionally relate transistor gate area to leakage current over a summed area of transistor gates associated with a circuit design. The total power can be computed by summing the leakage power and the switching power associated with the circuit design.

DETAILED DESCRIPTION

The present invention relates generally to systems and methods that can be utilized to estimate power (e.g., associated with a circuit design). The estimated power is determined by employing power characterizations associated with dynamic power related parameter(s) and static power related parameter(s). The power related parameters are utilized to estimate power consumption of a circuit design. The power characterizations can be determined and stored prior to circuit design optimizations, and utilized during circuit design optimizations for one or more circuit design instances. A circuit design instance is a particular timing, sizing and area optimized variation associated with the original circuit design.

In one aspect of the present invention, power consumption characterizations are employed for switching power related parameters (e.g., switching capacitance, crossover current) and leakage power related parameters (e.g., tunneling leakage, source-to-drain leakage). The characterizations can be readily employed during circuit design optimization to determine relatively quick and accurate power estimates associated with one or more circuit design instances.

The power estimates based on power characterizations can be computed for a circuit design. A circuit design can correspond to a node or other juncture between adjacent components, structures or blocks, as well as a circuit component, a functional or structural block, channel connected regions or any combination thereof. Power is estimated for a given circuit design based on one or more predefined power characterizations that functionally relate power related parameters generated by an analysis tool to power.

Figure 1:
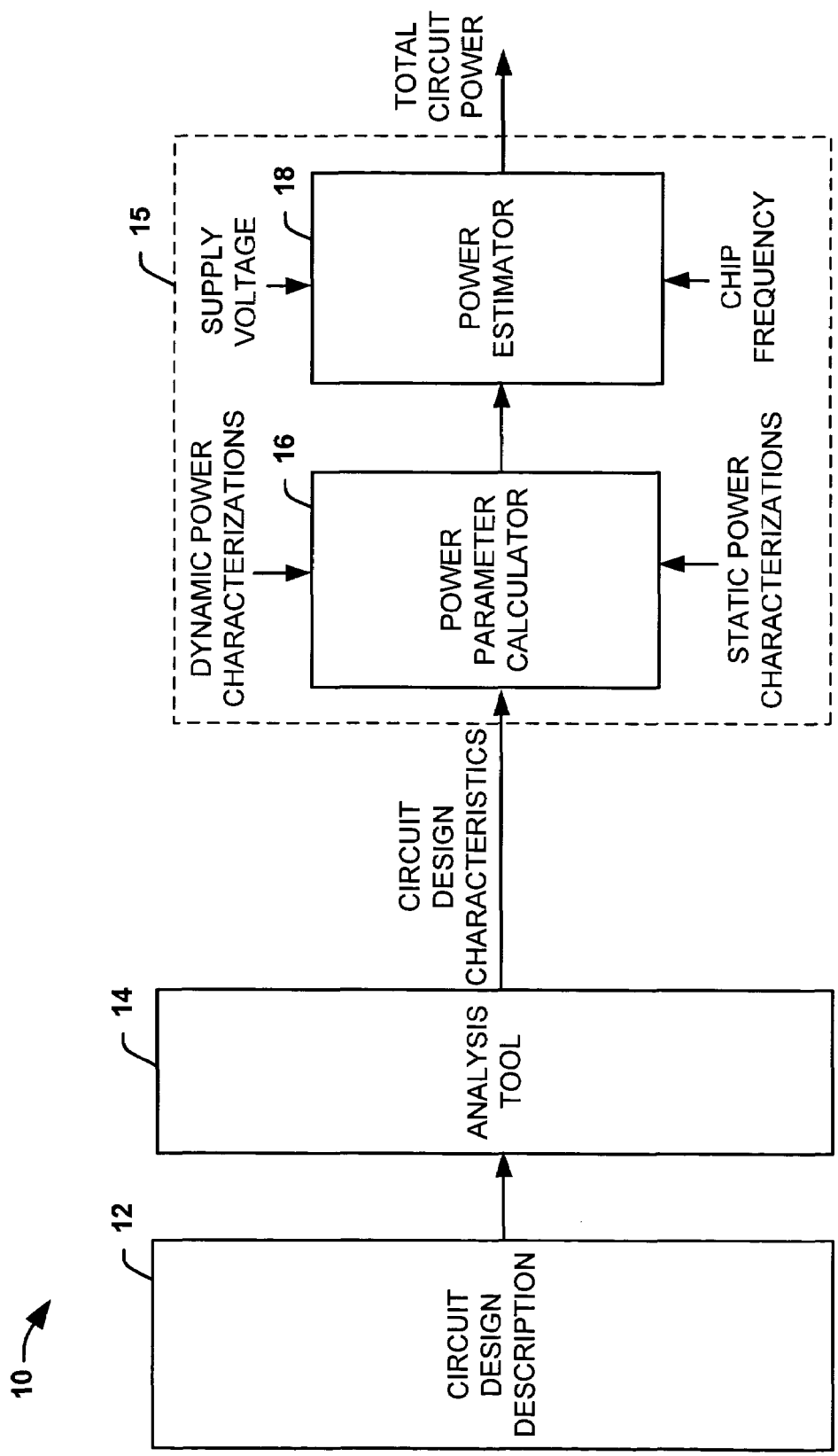
FIG. 1 illustrates a block diagram of a system for estimating power in accordance with an embodiment of the present invention.

FIG. 1 illustrates an analysis system 10 that can be implemented to estimate power in accordance with an aspect of the present invention. The analysis system 10 includes a power estimation system 15 comprised of a power parameter calculator 16 and a power estimator 18 that cooperate to perform power estimation based on both static power estimates (e.g., leakage power) and dynamic power estimates (e.g., switching power). In one aspect of the present invention, the power parameter calculator 16 employs one or more power characterizations associated with dynamic and/or static power to generate power related parameters associated with dynamic and/or static power. The one or more power characterizations are pre-determined by analyzing circuit design characteristics associated with a circuit design description 12 prior to execution of the power estimation system 15. The analysis can be performed by one or more circuit design analysis tools. The one or more dynamic and/or static power characterizations are then pre-stored, for example in memory, for access during execution of the power estimation system 15. The power estimation system 15 can then provide substantially accurate power estimation results for a plurality of circuit design instances relatively quicker than many power estimation tools.

The analysis system 10 employs the circuit design description 12 to provide information to an analysis tool 14. The design description 12 can include transistor netlists, design netlists, design parasitic data and timing constraints associated with the circuit design. The analysis tool 12 executes a device modification and timing algorithm to optimize a circuit design. For example, the analysis tool 12 can be a static timing analysis tool (e.g., PATHMILL® by Synopsys) for block and chip timing verification. A static timing analysis tool will generate a plurality of circuit design instances that correspond to device changes (e.g., transistor sizing, cell device modifications) based on timing and delay analysis to optimize the circuit design based on speed, power and area. Alternatively, the analysis tool 14 can be a transistor autosizer (e.g., AMPS® by Synopsys). Most transistor autosizers rely on heuristic approaches that focus on finding the best combination that will meet user-defined power and speed goals without changing the functionality of the design. The transistor autosizers employ an original circuit design description to generate a plurality of circuit sizing instances that define different optimized cell netlist configurations.

The analysis tool 14 performs timing analysis, transistor sizing optimization, device modifications and/or power analysis on the circuit design description. The analysis tool 14 executes timing analysis and modifies transistor sizes and/or circuit cell configurations to optimize the circuit design without disturbing the functionality associated with the circuit design. The analysis tool 14 then generates one or more circuit design characteristics for each associated circuit design instance. The circuit design instance relates to characteristics associated with the new optimized design. The circuit design characteristics will change for each instance, while the predetermined power characterizations will remain fixed during execution of the analysis tool 14. The power estimation system 15 then determines a power estimate of the circuit design instance based on the predetermined power characterizations and generated circuit design characteristics.

The power parameter calculator 16 employs the circuit design characteristics and the dynamic power characterizations and/or static power characterizations to generate power related parameters associated with dynamic and/or static power consumption of a circuit design instance. The power estimator 18 then evaluates total circuit power based on the power related parameters, chip supply voltage and chip frequency of the circuit design. For example, the dynamic power estimates can be based on switching power losses that include switching capacitance losses and/or crossover current losses. Therefore, switching capacitance and/or crossover current are dynamic power related parameters that can be determined to evaluate dynamic power loss. The static power losses can be associated with device leakage associated with transistor tunneling gate losses and/or source-to-drain leakage losses. Therefore, transistor tunneling gate losses and source-to-drain leakage losses are static power related parameters that can be determined to evaluate leakage power loss.

Figure 2:
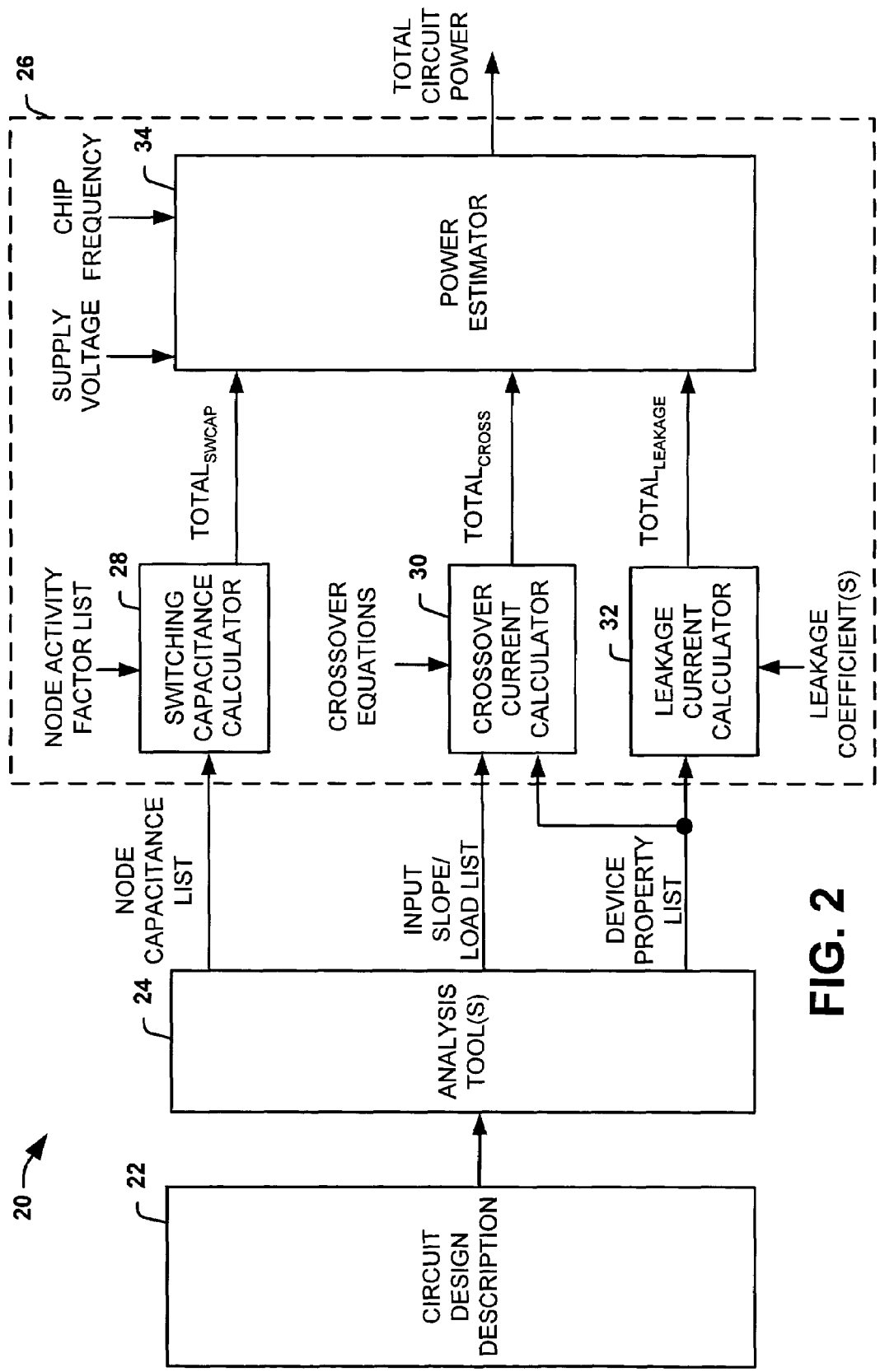
FIG. 2 illustrates a block diagram of a system for estimating power in accordance with another embodiment of the present invention.

FIG. 2 illustrates a system 20 that can be implemented to estimate power in accordance with another aspect of the present invention. The system 20 includes a power estimation engine 26 that performs power estimation based on both static power estimates and dynamic power estimates. The dynamic power estimates are based on both switching power and crossover current power consumption. The static power estimates are based on leakage power estimates. The power estimation engine 26 employs one or more power characterizations associated with switching power, crossover current power and leakage power. The one or more power characterizations are pre-determined by analyzing characteristics associated with a circuit design description 22 prior to execution of the power estimation engine 26. The one or more power characterizations are then stored to be utilized to determine power estimates for a plurality of circuit design instances.

The system 20 employs a circuit design description 22 to provide information to an analysis tool 24. The design description 22 can include transistor netlists, design netlists, design parasitic data and timing constraints associated with the circuit design. The analysis tool 24 executes a device modification and timing algorithm to optimize a circuit design. As previously discussed, the analysis tool can be a static timing analysis tool, a transistor autosizer or another circuit design optimization tool.

The analysis tool 24 executes timing analysis and modifies transistor sizes and/or circuit cell configurations to optimize the circuit design without disturbing the functionality associated with the circuit design. The analysis tool 24 then generates circuit design characteristics for each associated circuit design instance. For example, the analysis tool 24 provides a node capacitance list that can be employed to determine switching capacitance associated with each node of the circuit design. A pre-generated node activity factor (AF) list is employed with the node capacitance to determine the total switching capacitance of the circuit design. The switching capacitance is a power related parameter associated with dynamic power.

The node capacitance list includes the capacitance associated with each node in the circuit design. The associated capacitance of each node is based on the respective drive load at the node. The node activity factor list includes activity factors for each node. The activity factor corresponds to a toggle count of switching activity for a node normalized over a number of clock cycles. For example, functional verification can be utilized to generate an activity factor for nodes or junctures located between functional or structural blocks in the circuit design. The activity factor list can then be stored in a list or table to be employed to calculate the total switching capacitance of one or more circuit design instances associated with the circuit design.

The activity factor can be indicative of behavioral operating characteristics (e.g., switching activities, signal activities) and/or electrical operating characteristics (e.g., voltage, current, component values), or other characteristics of the circuit design for which the simulation is being implemented. In one particular implementation, the activity factor can include information indicative of node-level switching activities for the circuit design, such as provided by functional verification simulation. The node level switching activity can be employed to derive the activity factor for corresponding nodes.

A switching capacitance calculator 28 can determine the total switching capacitance (TOTAL$_{SWCAP}$) for the circuit design. The switching capacitance for a node is substantially equal to the activity factor (AF) for a given node multiplied by the node capacitance (CAP$_{NODE}$) for that node such the total switching capacitance can be evaluated by the switching capacitance calculator 28 as follows:

$$TOTAL_{SWCAP} = \sum_{i=1}^{i=k} AF_i * CAP_{NODE_i} \quad \text{EQ. 1}$$

where i is an integer from 1 to k and k is the number of nodes in the circuit design. The switching capacitance calculator 28 then provides the total switching capacitance to a power estimator 34.

The analysis tool 24 also provides crossover current related characteristics or parameters associated with channel connected regions of the circuit design. A channel connected region is a transistor or plurality of transistors connected in series that couple the supply voltage to ground, such that a short circuit condition between supply and ground can occur during logic transitions.

For example, the crossover current related characteristics or parameters can include the input voltage slope (VS) at the input of, and capacitive load (CL) at the output of a corresponding channel connected region, which is provided to a crossover current calculator 30. The input voltage slope and capacitive load list information is typically employed to determine delay associated with circuit devices (e.g., transistor devices, cell devices). The crossover current is current that is associated with short circuit current of devices in the circuit design. For example, in an inverter device comprised of a pull up transistor and a pull down transistor, there is a small amount of time when both the pull up and the pull down transistor are on, shorting the supply voltage to ground. The current flowing through the pull up and pull down transistors during this time period is referred to as the crossover current. The crossover current is therefore a function of the dynamic power.

The crossover current related parameters can also include device gate widths (e.g., p-type devices, n-type devices). The crossover current calculator 30 evaluates the crossover current for a plurality of channel connected regions employing the input voltage slope, capacitive load, device widths and respective crossover equations associated with respective channel connected regions in the circuit design to determine a total crossover current (TOTAL$_{CROSS}$). The total crossover current TOTAL$_{CROSS}$ is provided to the power estimator 34.

The analysis tool 24 also provides a device property list. The device property list includes information relating to the gate widths associated with p-type device, n-type devices, HVT devices, and LVT devices. A leakage current calculator 32 employs the device property list with one or more predetermined leakage coefficients to determine a total leakage current (TOTAL$_{LEAKAGE}$). The one or more leakage coefficients are determined by characterizing transistor MOSFET devices employing SPICE characteristics associated with transistor types (e.g., HVT p-type, HVT n-type, LVT p-type, LVT n-type). The one or more leakage coefficients can be multiplied by the device widths to provide a leakage power estimate.

The leakage power estimate includes a first leakage estimate associated with gate tunneling current and a second leakage current estimate associated with source-to-drain leakage. The first leakage estimate for gate tunneling current employs gate widths and leakage coefficients for p-type devices and gate widths and leakage coefficients for n-type devices. The second leakage estimate for source-to-drain leakage employs gate widths and leakage coefficients for HVT type devices and gate widths and leakage coefficients for LVT type devices.

The power estimator 34 receives the total switching capacitance (TOTAL$_{SWCAP}$), the total crossover current (TOTAL$_{CROSS}$) and the total leakage (TOTAL$_{LEAKAGE}$). The power estimator 34 also employs the circuit supply voltage (V$_{SUPPLY}$) and the chip frequency (f) of the circuit clock. The total switching capacitance (TOTAL$_{SWCAP}$), the total crossover current (TOTAL$_{CROSS}$), the supply voltage (V$_{SUPPLY}$) and the chip frequency (f) are employed to determine a total switching power. The total leakage current (TOTAL$_{LEAKAGE}$) and the supply voltage are employed to determine a total leakage power. The total circuit power is determined by adding the total switching power to the total leakage power.

In one aspect of the invention, the power estimator 34 determines the total switching power by evaluating the following equation:

$$P_{SWITCHING}=C_{SWITCHING}*V_{SUPPLY}^2*f+I_{CROSSOVER}*V_{SUPPLY} \quad \text{EQ. 2}$$

where C$_{SWITCHING}$ is the total switching capacitance (TOTAL$_{SWCAP}$), V$_{SUPPLY}$ is the supply voltage of the circuit design, f is the frequency of the circuit clock, and I$_{CROSSOVER}$ is the total crossover current (TOTAL$_{CROSS}$). The power estimator 34 determines the total leakage power by evaluating the following equation:

$$P_{LEAKAGE}=I_{LEAKAGE}*V_{SUPPLY} \quad \text{EQ. 3}$$

where I$_{LEAKAGE}$ is the total leakage current (TOTAL$_{LEAKAGE}$) and the total circuit power is determined by the power estimator 34 as follows:

$$P_{TOTAL}=P_{SWITCHING}+P_{LEAKAGE} \quad \text{EQ. 4}$$

Figure 3:
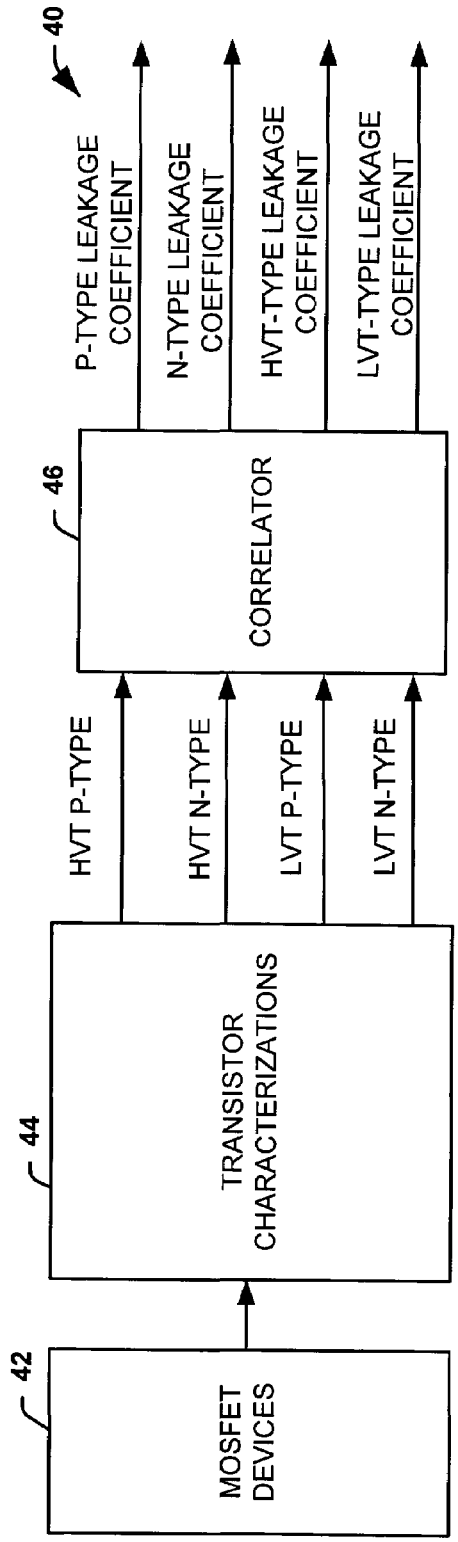
FIG. 3 illustrates a block diagram of a system for determining power coefficients associated with leakage current in accordance with an embodiment of the present invention.

FIG. 3 illustrates a system 40 for determining leakage coefficients associated with device leakage current in accordance with an aspect of the present invention. The system 40 employs transistor characterizations 44 for a plurality of transistor or MOSFET device types 42. The transistor characterizations 44 can be based on SPICE analysis of the transistor device and include characterizations associated with leakage current (e.g., source-to-drain, gate tunneling) of the devices. Transistor characterizations are provided to a correlator 46 for high voltage threshold (HVT) p-types, HVT n-types, low voltage threshold (LVT) p-types and LVT n-types. LVT transistor devices are used in performance-critical blocks to meet target clock frequency requirements, and HVT transistors are used in blocks with delay slacks to minimize overall leakage power. The p-type devices and the n-type devices are employed to determine leakage current associated with gate tunneling leakage, and the HVT type devices and the LVT type devices are employed to determine leakage associated with transistor source-to-drain leakage. The correlator 46 determines a p-type leakage coefficient, a n-type leakage coefficient, a HVT type leakage coefficient and a LVT type leakage coefficient.

Figure 4:
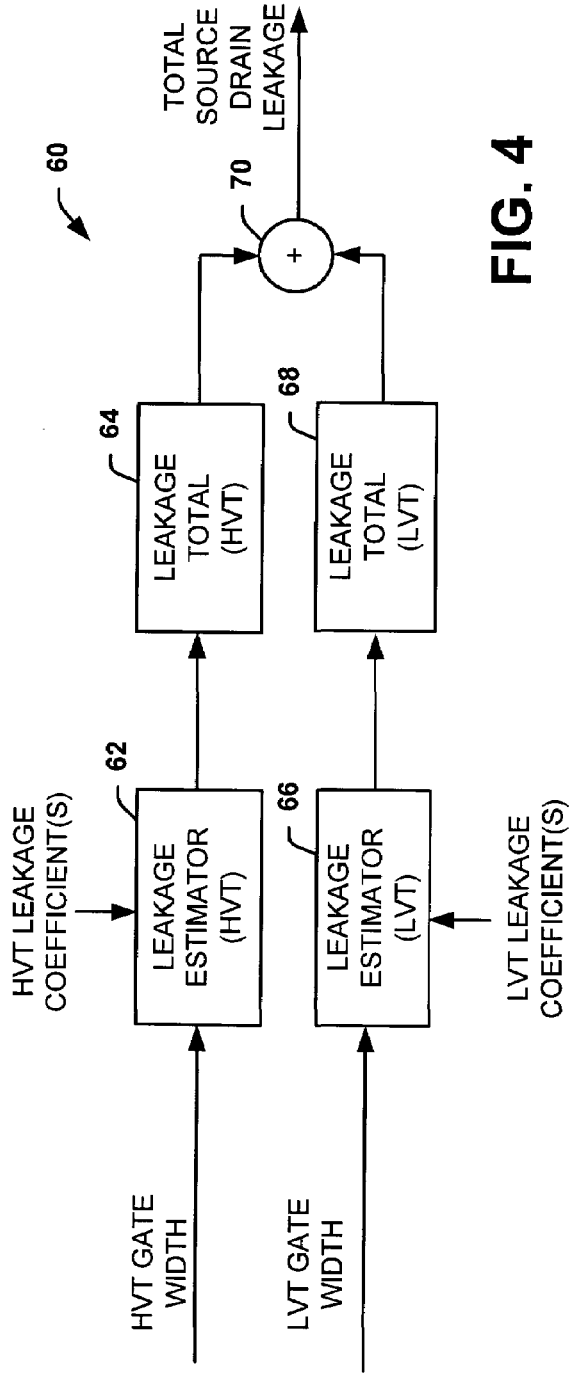
FIG. 4 illustrates a block diagram of a system for determining total source-to-drain leakage in accordance with an embodiment of the present invention.

FIG. 4 illustrates a system 60 for determining total source-to-drain leakage in accordance with an aspect of the present invention. The system 60 includes a first leakage estimator 62 (HVT) that determines source-to-drain leakage associated with HVT devices, and a second leakage estimator 66 (LVT) that determines source-to-drain leakage associated with LVT devices. The first estimator 62 employs the HVT gate width associated with the HVT devices in the circuit design and one or more HVT leakage coefficients to determine a total HVT leakage current 64 associated with the source-to-drain leakage of HVT devices in the circuit design. The total HVT leakage current 64 can be determined by evaluating the leakage associated with each device employing the HVT leakage coefficients to provide incremental leakage calculations that can be totaled together. Alternatively, the leakage can be evaluated by determining the sum of all of the HVT device gate areas and employing the HVT coefficients to determine the total HVT leakage 64. The HVT leakage coefficients can be one or more multipliers and/or offset coefficients that can be multiplied and/or added to the HVT gate widths to provide a source-to-drain leakage estimate with respect to HVT devices.

The second estimator 66 employs the LVT gate width associated with the LVT devices in the circuit design and one or more LVT leakage coefficients to determine a total LVT leakage current 68 associated with the source-to-drain leakage of LVT devices in the circuit design. The total LVT leakage 68 can be determined by evaluating the leakage associated with each LVT device employing the LVT leakage coefficients to provide incremental leakage calculations that can be totaled together. Alternatively, the leakage can be evaluated by determining the sum of all of the LVT device gate areas and employing the LVT coefficients to determine the total LVT leakage 68. The LVT leakage coefficients can be one or more multipliers and/or offset coefficients that can be multiplied and/or added to the LVT gate width to provide a source-to-drain leakage estimate with respect to LVT devices. The total HVT leakage 64 and the total LVT leakage 68 can be summed together via an adder 70 to provide the total source-to-drain leakage associated with the circuit design.

Figure 5:
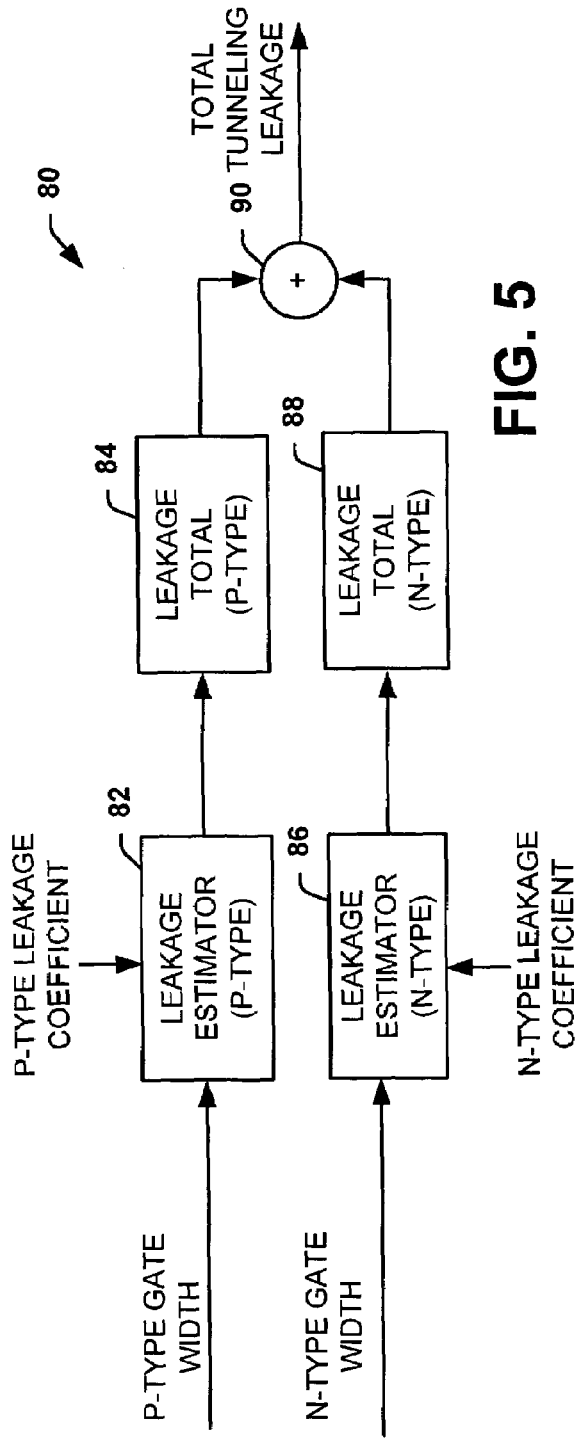
FIG. 5 illustrates a block diagram of a system for determining total gate tunneling leakage in accordance with an embodiment of the present invention.

FIG. 5 illustrates a system 80 for determining total gate tunneling leakage in accordance with an aspect of the present invention. The system 80 includes a first p-type leakage estimator 82 that determines gate tunneling leakage associated with p-type devices, and a second n-type leakage estimator 86 that determines gate tunneling leakage associated with n-type devices. The first p-type leakage estimator 82 employs the p-type gate widths associated with the p-type devices in the circuit design, and one or more p-type leakage coefficients to determine a total p-type leakage current 84 associated with the gate tunneling leakage of p-type devices in the circuit design. The total p-type leakage current 84 can be determined by evaluating the leakage associated with each p-type device employing the p-type leakage coefficients to provide incremental leakage calculations that can be totaled together. Alternatively, the leakage can be evaluated by determining the sum of all of the p-type device gate areas and employing the p-type coefficients to determine the p-type leakage total 84. The p-type leakage coefficients can be one or more multipliers and/or offset coefficients that can be multiplied and/or added to the p-type gate widths to provide a gate tunneling leakage estimate associated with p-type devices.

The second n-type leakage estimator 86 employs the n-type device gate widths associated with the n-type devices in the circuit design, and one or more n-type leakage coefficients to determine an n-type leakage total 88 associated with the gate tunneling leakage of n-type devices in the circuit design. The total n-type leakage can be determined by evaluating the leakage associated with each n-type device employing the n-type leakage coefficients to provide incremental leakage calculations that can be totaled together to provide the n-type leakage total 88. Alternatively, the leakage can be evaluated by determining the sum of all of the n-type device gate areas and employing the n-type coefficients to determine the n-type leakage total 88. The n-type leakage coefficients can be one or more multipliers and/or offset coefficients that can be multiplied and/or added to the n-type gate widths to provide a gate tunneling leakage estimate for n-type devices. The total p-type leakage 84 and the total n-type leakage 88 can be summed together via an adder 90 to provide the total gate tunneling leakage associated with the circuit design. The total gate tunneling leakage can be added to the total source gate leakage to provide a total leakage current for the circuit design.

Figure 6:
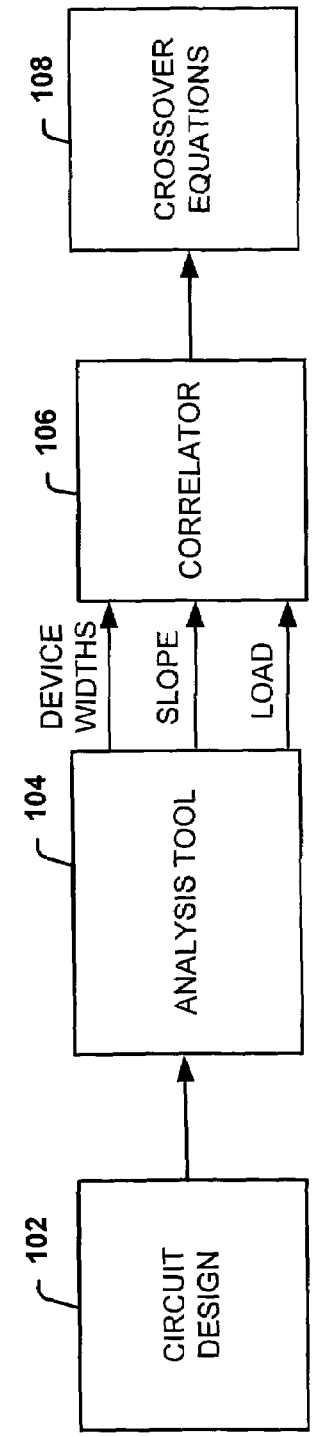
FIG. 6 illustrates a block diagram of a system for determining power equations associated with crossover current in accordance with an embodiment of the present invention.

FIG. 6 illustrates a system 100 for determining crossover current equations in accordance with an aspect of the present invention. The system 100 employs an analysis tool 104 that generates a plurality of circuit design characteristics associated with a circuit design description 102. The circuit design description 102 can be defined by transistor netlists, design netlists, design parasitic data and timing constraints associated with the circuit design. The circuit design characteristics include characteristics associated with crossover current related parameters and/or information that can be employed to determine a power estimate associated with crossover current losses. The crossover current equations are selected to mitigate time associated with calculating crossover currents of a circuit design.

The analysis tool 104 generates device widths, such as transistor gate widths, voltage input node slopes and capacitor loads associated with a plurality of channel connected regions. A correlator 106 analyzes the various power related parameters and associated crossover current leakage to determine crossover equations 108 corresponding to channel connected regions of the circuit design. The crossover equations 108 can then be employed during optimizations to determine a total crossover current associated with a plurality of corresponding circuit design instances.

Figure 7:
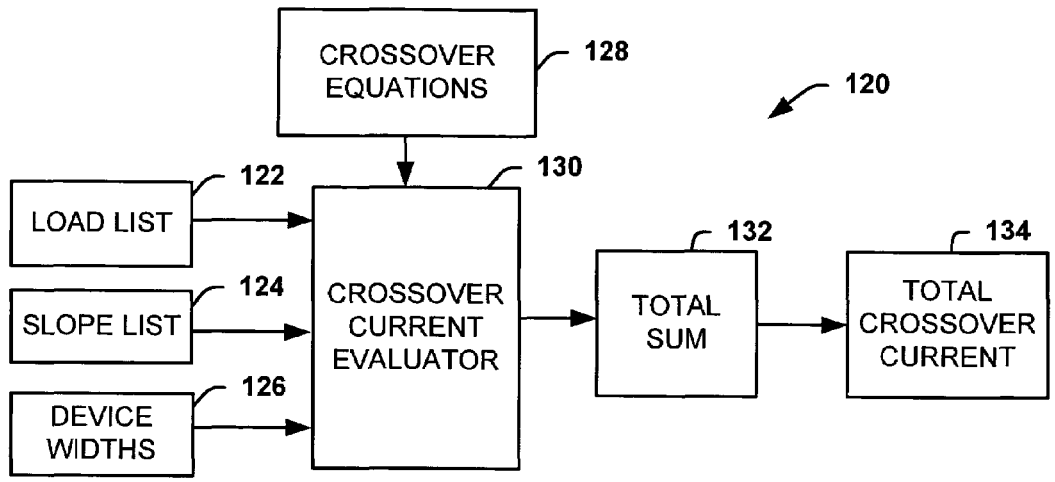
FIG. 7 illustrates a block diagram of a system for determining total crossover current in accordance with an embodiment of the present invention.

FIG. 7 illustrates a system 120 for determining a total crossover current in accordance with an aspect of the present invention. The crossover current relates to power losses associated with transistors, inverters and other circuits that temporarily short circuit the voltage supply to ground during logic transitions. The system 120 employs a crossover current evaluator 130 that employs predetermined crossover equations 128 to determine crossover currents associated with transistors and/or transistor devices in a circuit design. The crossover equations 128 are employed to determine crossover currents for transistors and/or transistor devices (e.g., inverters) in a circuit design employing a plurality of circuit design characteristics generated by a static timing analysis tool or similar simulation/optimization tool.

The crossover current evaluator 130 receives an input voltage slope list 124, a capacitive load list 122 and a device widths list 126 associated with transistors and/or transistor devices (e.g., channel connected regions) based on a given circuit instance. The crossover current evaluator 130 determines a crossover current for each channel connected region by employing a device width, a load, a slope, and an associated equation for a respective channel connected region. Each crossover current is provided to a summer 132 that sums up the determined crossover currents to provide a total crossover current 134 for an associated circuit design instance.

The device widths can be widths associated with each channel connected region in the circuit design. This width can be an actual width as determined, for example, by CAD software, or an estimated width. For example, the width can be estimated by summing the width of each MOSFET in a set of parallel MOSFETs. Alternatively, the width can be estimated by combining the widths of two MOSFETs in series by dividing one by a sum of one divided by the width of the first serial MOSFET and one divided by the width of the second serial MOSFET. The width can be also be estimated by similar combinations of previously estimated MOSFET widths.

Figure 8:
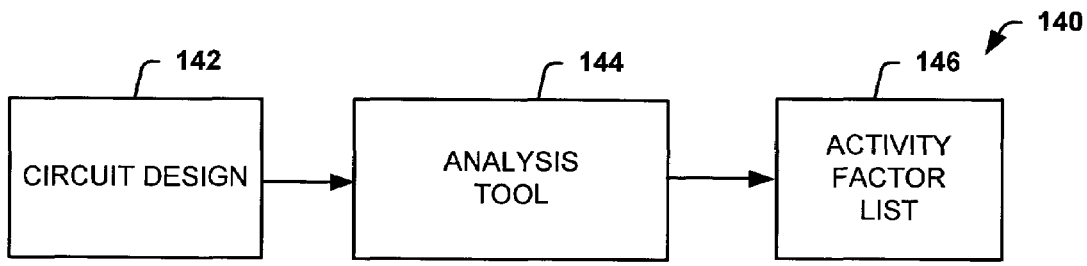
FIG. 8 illustrates a block diagram of a system for determining an activity factor list in accordance with an embodiment of the present invention.

FIG. 8 illustrates a system 140 for providing an activity factor list in accordance with an aspect of the present invention. An analysis tool 144 (e.g., a power analysis tool) analyzes a circuit design to determine switching relating activity associated with the circuit design. The switching related activity can be employed to determine an activity factor associated with each node of the circuit design. The activity factor corresponds to a toggle count of switching activity for a node normalized over a number of clock cycles. For example, the system clock has an activity factor of 1, while a node that switches every other clock cycle has an activity factor of 0.5. The activity factor functions as a weighting factor for a given node with respect to dynamic power versus static power. An activity factor list 146 is then generated based on the switching activity analysis. The activity factor list 146 can be employed in determining total switching capacitance associated with a circuit design.

Figure 9:
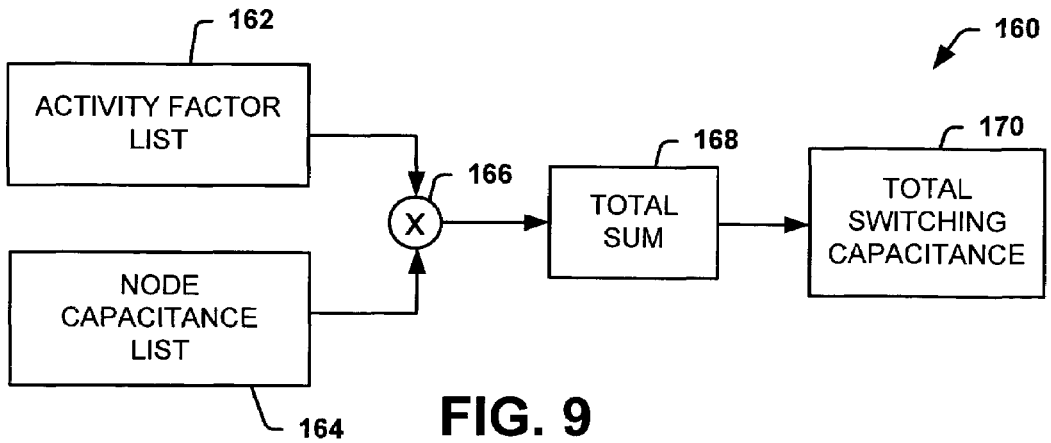
FIG. 9 illustrates a block diagram of a system for determining total switching capacitance in accordance with an embodiment of the present invention.

FIG. 9 illustrates a system 160 for determining a total switching capacitance in accordance with an aspect of the present invention. The system 160 employs an activity factor list 162 than can be determined employing one or more analysis tools, as illustrated in FIG. 8. The system 160 also employs a node capacitance list 164 that can be generated by a static timing analysis tool. The system 160 extracts an activity factor and a node capacitance associated with a given node. The node capacitance is multiplied by a node activity factor via a multiplier 166 to provide a respective node switching capacitance. The respective node capacitance is then provided to a summer 168 that sums the switching capacitance for each node to provide a total switching capacitance 170. The total switching capacitance 170 can be employed to determine switching power consumption.

Figure 10:
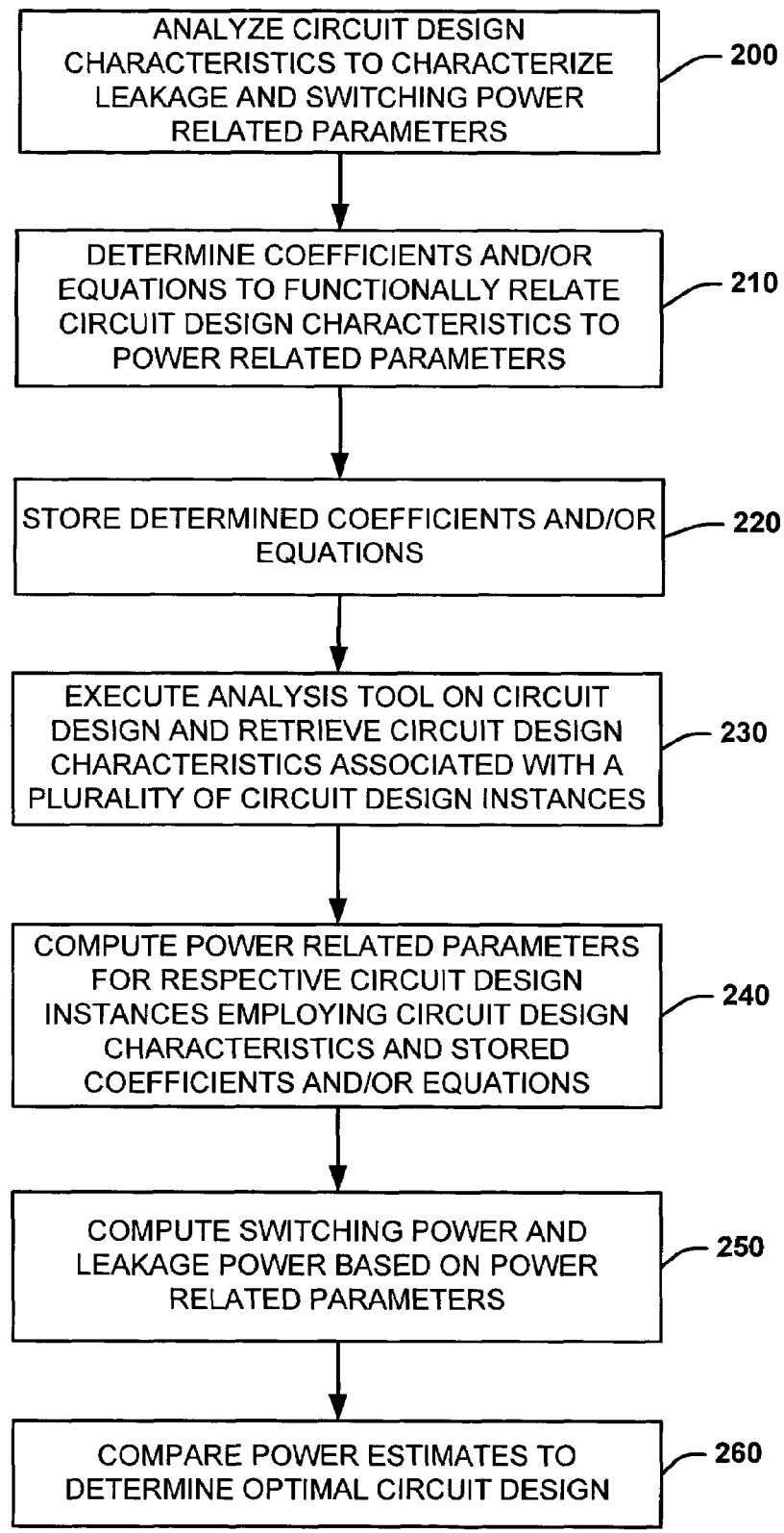
FIG. 10 is a flow diagram illustrating a methodology for estimating power in accordance with an embodiment of the present invention.

In view of the foregoing structural and functional features described above, a methodology for estimating power, in accordance with an aspect of the present invention, will be better appreciated with reference to FIG. 10. While, for purposes of simplicity of explanation, the methodology of FIG. 10 is shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement a methodology in accordance with an aspect of the present invention. It is to be further understood that the following methodology can be implemented in hardware, software (e.g., computer executable instructions), or any combination thereof.

FIG. 10 illustrates a methodology for estimating power of a circuit design in accordance with an aspect of the present invention. The methodology begins at 200 in which circuit design characteristics associated with a circuit design are analyzed to characterize leakage and switching power related parameters. The circuit design can be analyzed by employing one or more analysis tools (e.g., timing tool, optimization tool, power estimation tool). The leakage current power related parameters can include both gate tunneling leakage and source-to-drain leakage of transistor devices. The switching power related parameters can include both switching capacitance and crossover current. At 210, coefficients and/or equations are determined to functionally relate circuit design characteristics to power related parameters generated by an analysis tool. The determined coefficients and/or equations are then stored in memory at 220. The methodology then proceeds to 230.

At 230, an analysis tool is executed on the circuit design to retrieve circuit design characteristics associated with a plurality of circuit design instances. The circuit design characteristics include circuit design characteristics associated with both switching power and leakage power. At 240, power related parameters are computed for respective circuit design instances employing the circuit design characteristics and the stored coefficients and/or equations.

For example, the circuit design characteristics can include node capacitance and the stored coefficients and/or equations can be activity factors associated with each node. The node capacitance and associated activity factor can be employed to determine the switching capacitance associated with the circuit design. The circuit design characteristics can also include input slope, capacitive load and device gate width information corresponding to channel connected regions, such that crossover equations can be employed to determine crossover current associated with channel connected regions of the circuit design.

The circuit design characteristics can include transistor gate widths for HVT p-type and n-type devices and LVT p-type and n-type devices. The p-type devices and n-type devices along with p-type and n-type device coefficients can be employed to determine gate tunneling leakage. The HVT type devices and LVT type devices along with HVT type and LVT type device coefficients can be employed to determine source-to-drain leakage. The source-to-drain leakage and the gate tunneling leakage can be summed together to determine total leakage of the circuit design instances.

At 250, the total switching power and the total leakage power is computed based on the power related parameters. The crossover current and the switching capacitance are power related parameters that can be employed to compute total switching power for the plurality of circuit design instances by evaluating EQ. 2 above. The total leakage current is a power related parameter that can be employed to compute total leakage power by evaluating EQ. 3 above. The total power can be determined by adding the total leakage power and the total switching power by evaluating EQ. 4 above. At 260, power estimates for a plurality of circuit design instances are compared to determine an optimal circuit design.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A power estimation system, comprising:
    means for determining switching power related parameters by evaluating predetermined characterizations that functionally relate a first set of circuit design characteristics as a function of switching power related parameters, the means for determining switching power related parameters comprising means for determining crossover current over a plurality of channel connected regions by evaluating predetermined crossover equations with respective crossover current parameters for a given channel connected region over a plurality of channel connected regions, and summing the determined crossover currents to generate a total crossover current;
    means for determining leakage power related parameters by evaluating predetermined characterizations that functionally relate a second set of circuit design characteristics as a function of leakage power related parameters; and
    means for generating a total power estimate based on the switching power related parameters and the leakage power related parameters.

2. The system of claim 1, the means for determining switching power related parameters comprising means for determining switching capacitance.

3. The system of claim 2, wherein the means for determining switching capacitance determines switching node capacitance over a plurality of nodes by multiplying node capacitance by a predetermined activity factor associated with a given node over a plurality of nodes, and summing the determined switching capacitances to generate a total switching capacitance.

4. The system of claim 1, the means for determining leakage power related parameters comprising means for determining gate tunneling leakage and means for determining source-to-drain leakage.

5. The system of claim 1, the means for determining leakage power related parameters determines leakage currents for a plurality of transistor devices by multiplying predetermined leakage coefficients associated with a given transistor type by the sums of transistor gate areas associated with the given type for a plurality of transistor types, and summing the determined leakage currents to generate a total leakage current.

6. The system of claim 1, the means for generating a total power estimate determines the total circuit power associated with the circuit design by evaluating the equation:

$$P_{TOTAL}=C_{SWITCHING}*V_{SUPPLY}^2*f+I_{CROSSOVER}*V_{SUPPLY}+I_{LEAKAGE}*V_{SUPPLY}$$

where $C_{SWITCHING}$ is a total switching capacitance of the circuit design, $V_{SUPPLY}$ is the supply voltage of the circuit design, f is the frequency of the clock of the circuit design, $I_{CROSSOVER}$ is a total crossover current of the circuit design and $I_{LEAKAGE}$ is a total leakage current of the circuit design.

7. A power estimation method for a circuit design, comprising:
    computing at least one switching power related parameter based on a first set of circuit design characteristics and a first predetermined characterization of switching power related parameters as a function of the first set of circuit design characteristics;
    computing at least one leakage power related parameter based on a second set of circuit design characteristics and a predetermined characterization of leakage power related parameters as a function of the second set of circuit design characteristics, the computing at least one leakage power related parameter comprising determining gate tunneling leakage by adding a sum of transistor gate areas of p-type devices multiplied by a predetermined p-type leakage coefficient to a sum of transistor gate areas of n-type devices multiplied by a predetermined n-type leakage coefficient, and determining source-to-drain leakage by adding a sum of transistor gate areas of high voltage threshold (HVT)-type devices multiplied by a predetermined HVT-type leakage coefficient to a sum of transistor gate areas of low voltage threshold (LVT)-type devices multiplied by a predetermined LVT-type leakage coefficient; and
    determining total circuit design power based on the computed at least one switching power related parameter and the computed at least one leakage power related parameter.

8. The method of claim 7, the computing at least one switching power related parameter comprising determining switching capacitance by multiplying node capacitance by an associated predetermined activity factor for a plurality of nodes, and summing the switching capacitances to generate a total switching capacitance, and determining crossover current by evaluating predetermined equations that functional relate channel connected region characteristics to crossover current, and summing crossover current over a plurality of channel connected regions.

9. The method of claim 8, wherein the crossover current characteristics comprise transistor device gate widths, input voltage slopes and capacitive load information associated with the plurality of channel connected regions.

10. A computer-readable medium having computer-executable instructions for performing the method of claim 7.

11. The method of claim 7, further comprising:
executing an analysis tool for a plurality of circuit design instances;
computing a plurality of power estimates associated with the plurality of circuit design instances; and
comparing the power estimates to determine an optimal circuit design.

12. A power estimation system, comprising:
means for determining switching power related parameters by evaluating predetermined characterizations that functionally relate a first set of circuit design characteristics as a function of switching power related parameters;
means for determining leakage power related parameters by evaluating predetermined characterizations that functionally relate a second set of circuit design characteristics as a function of leakage power related parameters, the means for determining leakage power determines leakage currents for a plurality of transistor devices by multiplying predetermined leakage coefficients associated with a given transistor type by the sums of transistor gate areas associated with the given type for a plurality of transistor types, and summing the determined leakage currents to generate a total leakage current; and
means for generating a total power estimate based on the switching power related parameters and the leakage power related parameters.

13. The system of claim 12, the means for determining leakage power related parameters comprising means for determining gate tunneling leakage and means for determining source-to-drain leakage.

14. The system of claim 12, the means for determining switching power related parameters comprising means for determining switching capacitance over a plurality of nodes by multiplying node capacitance by a predetermined activity factor associated with a given node over a plurality of nodes, and summing the determined switching capacitances to generate a total switching capacitance, and means for determining crossover current over a plurality of channel connected regions by evaluating predetermined crossover equations with respective crossover current parameters for a given channel connected region over a plurality of channel connected regions, and summing the determined crossover currents to generate a total crossover current.

15. A power estimation method for a circuit design, comprising:
analyzing the circuit design to determine a switching capacitance characterization, a crossover current characterization and a leakage current characterization associated with the circuit design;
storing the switching capacitance characterization, the crossover current characterization and the leakage current characterization;
receiving a plurality of circuit design characteristics associated with a given instance of the circuit design;
computing total switching capacitance based on node capacitance of the given instance of the circuit design and the switching capacitance characterization;
computing total crossover current based on crossover current parameters of the given instance of the circuit design and the crossover current characterization;
computing total leakage current based on transistor gate area of the given instance of the circuit design and the leakage current characterization; and
determining total power of the given instance of the circuit design based on the computed total switching capacitance, total crossover current and total leakage current.

16. The method of claim 15, the crossover current characterization comprises predetermined crossover current equations that functional relate channel connected region characteristics to crossover current.

17. The method of claim 16, wherein the total crossover current is computed by evaluating predetermined crossover equations with respective crossover current parameters for a given channel connected region over a plurality of channel connected regions, and summing the determined crossover currents to generate the total crossover current.

18. The method of claim 15, the switching capacitance characterization comprises a predetermined activity factor associated with a given node over a plurality of nodes.

19. The method of claim 18, wherein the total switching capacitance is determined by multiplying node capacitance by a predetermined activity factor associated with a given node over a plurality of nodes, and summing the determined switching capacitances to generate the total switching capacitance.

20. The method of claim 15, the leakage current characterization comprises at least one predetermined leakage coefficient associated with at least one given transistor type.

21. The method of claim 20, wherein a total leakage current is computed by multiplying a predetermined leakage coefficient associated with a given transistor type by the sums of transistor gate areas associated with the given type for at least one transistor type, and summing the determined leakage currents to generate the total leakage current.

22. A computer-readable medium having computer-executable instructions for performing the method of claim 15.

23. The method of claim 15, further comprising:
executing an analysis tool for a plurality of circuit design instances;
computing a plurality of power estimates associated with the plurality of circuit design instances; and
comparing the power estimates to determine an optimal circuit design.

24. The method of claim 15, wherein the determining total power of the given instance of the circuit design is based on evaluating the equation:

$$P_{TOTAL} = C_{SWITCHING} * V_{SUPPLY}^2 * f + I_{CROSSOVER} * V_{SUPPLY} + I_{LEAKAGE} * V_{SUPPLY}$$

where $C_{SWITCHING}$ is a total switching capacitance of the circuit design instance, $V_{SUPPLY}$ is the supply voltage of the circuit design instance, f is the frequency of the clock of the circuit design instance, $I_{CROSSOVER}$ is a total crossover current of the circuit design instance and $I_{LEAKAGE}$ is a total leakage current of the circuit design instance.

* * * * *